United States Patent
Marshall et al.

(10) Patent No.: US 7,831,993 B2
(45) Date of Patent: Nov. 9, 2010

(54) ON-LINE DATA DISTRIBUTION AND BROADCAST SYSTEM

(76) Inventors: Robert S. Marshall, 10230 Greensward Link, Ijamsville, MD (US) 21754; Christopher D. Sloop, 305 Thornberry Ct., Mount Airy, MD (US) 21771

( * ) Notice: Subject to any disclaimer, the term of this patent is extended or adjusted under 35 U.S.C. 154(b) by 1694 days.

(21) Appl. No.: 09/809,004

(22) Filed: Mar. 16, 2001

(65) Prior Publication Data
US 2001/0042251 A1     Nov. 15, 2001

(51) Int. Cl.
*H04N 7/173*     (2006.01)
*G06F 15/16*     (2006.01)
*H04N 5/445*     (2006.01)
*G06F 3/00*      (2006.01)
*G06F 13/00*     (2006.01)

(52) U.S. Cl. .......................... 725/115; 725/37; 725/86; 725/91; 709/201

(58) Field of Classification Search ................. 725/105, 725/109, 114, 115, 116, 36
See application file for complete search history.

(56) References Cited

U.S. PATENT DOCUMENTS

| 5,654,886 | A | * | 8/1997 | Zereski et al. ................. 702/3 |
| 5,818,441 | A | * | 10/1998 | Throckmorton et al. ...... 715/717 |
| 6,075,551 | A | * | 6/2000 | Berezowski et al. .......... 725/36 |
| 6,330,566 | B1 | * | 12/2001 | Durham .................... 707/104.1 |
| 6,564,380 | B1 | * | 5/2003 | Murphy ....................... 725/86 |
| 2001/0025255 | A1 | * | 9/2001 | Gaudian ..................... 705/26 |

* cited by examiner

*Primary Examiner*—Dominic D Saltarelli
(74) *Attorney, Agent, or Firm*—Oblon, Spivak, McClelland, Maier & Neustadt, L.L.P.

(57) ABSTRACT

Information from a database containing weather and sports information is customized to the needs of specific broadcaster customers in an editing procedure that is remote in location from the customers. Selected information is formatted and integrated with suitable graphics in the editing procedure to produce a plurality of individualized data streams that are ready for on-air broadcast. Those data streams are transmitted to an Internet web site for on-call customer access, and a customer may then broadcast the data stream as it is received from the web site.

18 Claims, 2 Drawing Sheets

InstaSports Broadcast Main Menu

50 →

51 — On Air Tickers         60 — On Air Ticker Setup

53 — Welcome Ticker          61 — Setup Welcome Ticker
    Schedule Ticker — 54        Setup Schedule Ticker — 62
55 — Scores Ticker           63 — Setup Scores Ticker
    Full Screen Scores Ticker — 56   Setup Full Screen Scores Ticker — 64
    Combination Schedule + Scores Ticker    65 — Setup Sponsor Logos
57 —                              Setup Sport Ordering — 66

Figure 2

Weather Ticker Main Menu

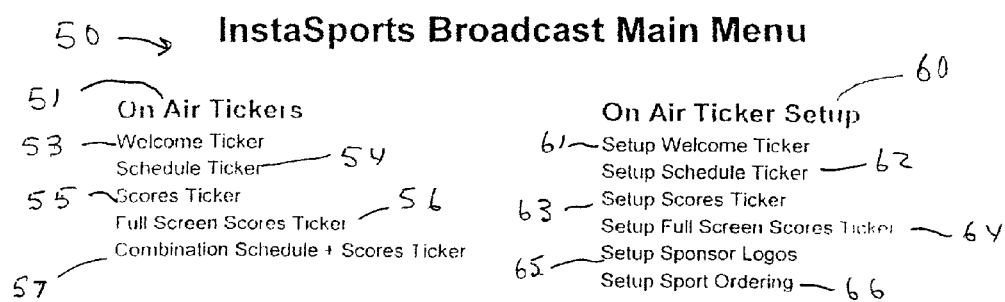

- Default Settings — 72
- Select Weather Data — 73
- Edit Station Info — 74
- Run Weather Ticker — 75

Weather Ticker : Select Data

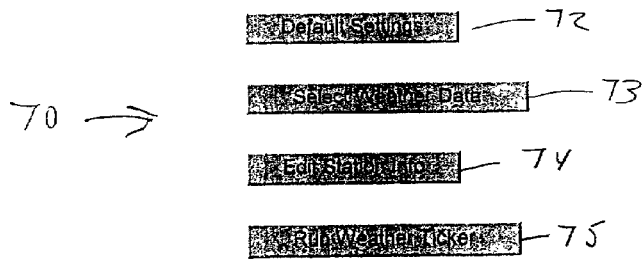

Return to Main Menu

| | Column1 | Column2 | Column3 | Column4 |
|---|---|---|---|---|
| Data Value | Outdoor_Temperature | High_Out_Temp_ | Low_Out_Temp_ | Wind_Gust |
| Append Text | | | | MPH |
| Save | Note: For Degree Symbol type "DGRE" into the Text Box. | | | |

ON-LINE DATA DISTRIBUTION AND BROADCAST SYSTEM

BACKGROUND OF THE INVENTION

1. Technical Field

This invention relates to a system and program to distribute and sell information that is contained in a dynamic database and to make that information available to users by way of television broadcast media.

More particularly, this invention relates to a method and means to provide television broadcasters a customized stream of edited data and accompanying graphics that is suitable for on-air display by a television broadcaster.

2. Description of Related Art

It is conventional at this time for the owner, creator, or merchandiser of data and graphics to deliver that material to a television broadcaster by e-mail or disk for on-air transmission. Graphics to accompany the presentation of such data are often generated in house by the television broadcaster to meet its specific programming and formatting requirements. The resulting media product may be presented, for example, in full screen, or in ticker or window format.

Integration of a purchased data stream by a television broadcaster into a desired broadcast format requires that the broadcaster maintain a staff and facilities adequate to perform that function. It also requires that the broadcaster select and maintain its editing and formatting software to be fully compatible with that used by its data providers.

It is apparent that a data and graphics stream that is ready for broadcast and customized to meet the needs and specifications of individual television broadcasters would avoid many of the disadvantages and responsibilities of the systems presently in use. This invention has that capability.

SUMMARY OF THE INVENTION

This invention provides a system for merchandising and distributing information that is contained in a database, and particularly a proprietary database, in a real-time, customized, and ready for broadcast format. An Internet web site is established by the database owner, and access to the web site is controlled and restricted to its customers which typically are television broadcasters. A customer broadcaster may access the web site through a web browser and obtain a particular and defined stream of data that is input by the database owner. That stream of data is customized and formatted to each customer's specifications by the database owner in a form that is ready for immediate on-air broadcast.

It is therefore an object of this invention to provide a system for merchandising a database in a customized form and in a broadcast format.

A specific object of this invention is to provide continuously updated weather and sports information in a customized format ready for television broadcast.

Other objects will become apparent from the following description of preferred embodiments of the invention.

BRIEF DESCRIPTION OF THE DRAWINGS

Specific and preferred embodiments of this invention are illustrated and described with reference to the drawing figures in which:

FIG. 2 illustrates a typical main menu that would be provided to a television broadcaster using the system of this invention to obtain access to a sports information database;

FIG. 3 illustrates a typical main menu that would be provided to a television broadcaster using the system of this invention to obtain access to a weather information database; and FIG. 4 illustrates a typical sub-menu that is accessed by a broadcaster through the main menu of FIG. 3 to specify the content and format of a data stream

DESCRIPTION OF PREFERRED EMBODIMENTS OF THE INVENTION

Figure 1:
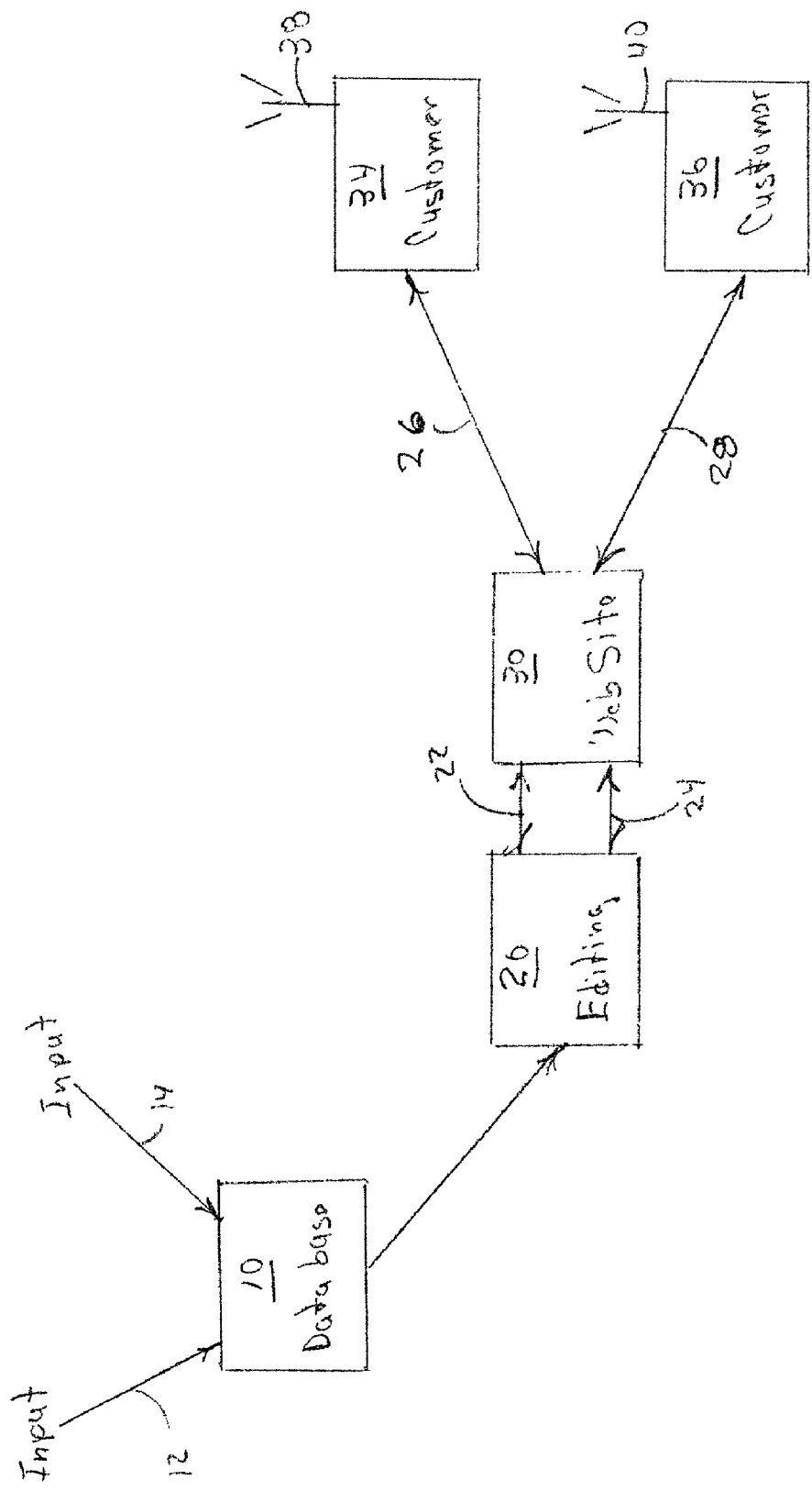
FIG. 1 is a diagrammatic illustration of the system of this invention showing the relationships between and among the system participants.

This invention, in its broadest form, provides a single remote editing location that supplies streams of data, and particularly proprietary data, that are customized to the individual needs and specifications of multiple television broadcaster customers. Each data stream is ready for on-air transmission without further editing by television station personnel.

The data editing, distribution and broadcast system of this invention will be described first by reference to FIG. 1. A proprietary database 10 is established and maintained with either a continuous or periodic input of information gathered from external sources. For purposes of illustration, input 12 may be weather data that is continuously gathered from a plurality of weather station sites. Those weather station sites are typically located at schools within the television station's dominant marketing area. The weather data that is gathered may include temperature, relative humidity, wind speed, wind direction, precipitation rate and accumulated amount, and other data of a similar nature. Data input 14 may include sports information such as, for example, the latest available information on scholastic and league amateur sports, team players, game schedules, team and player rankings, and the like.

Information from the database 10 is then selected, formatted, and integrated with suitable graphics in editing procedure 20. That editing produces a plurality of real-time data streams, each assigned to a specific customer, that are transmitted to web site 30 by way of communications channels 22, 24. Each data stream is tailored to an individual customer's needs and specifications, and is ready for on-air broadcast. An individual customer 34, 36 may access the web site, 30 by way of communications channels 26 and 28 respectively, to obtain access to its particular and individualized data stream. Because each data stream has been tailored to meet the broadcast requirements of a particular broadcaster customer, the data stream may be aired in real time as it is taken from the web site through transmission means 38 and 40 respectively. Voice overlay or commentary may accompany the transmission. Web site 30 is secured for use by authorized customers only by means of pass word protection in the usual fashion.

Although some, or even most, of the information contained in an individual data stream 22 may be common to that contained in another information stream 24, that common information may be differently formatted and otherwise customized to the needs and wishes of each individual broadcaster. For example, the information may be integrated in a different manner, presented with different graphics, and formatted distinctively. Also, weather information from the customer's marketing area may be integrated with sports information from that same area. For example, such integration may include a local forecast of game-time weather conditions at a specific game site, or to highlight other relationships.

Formatting options may include data presentation in ticker form or in a full screen, window, or split screen arrangement.

FIGS. 2, 3 and 4 are illustrative of menus that are provided to a customer. FIG. 2 is an example of a main menu 50 that is prepared for use by a customer of a sports information database to call up various data streams for broadcast and to specify data selection and formatting options. The left column 51 lists the various on-air tickers that are constantly being revised and updated in the editing procedure 20 to make each data stream continuously available for real time, on-air broadcast. In this particular instance, the customer can choose among a variety of options including a welcome ticker 53 that may be designed to introduce the service to the customers broadcast audience, a schedule ticker 54 listing upcoming games and contests of interest to the audience, a split screen or banner style scores ticker 55 transmitting the results of such games and contests, a full screen scores ticker 56, and a combination schedule and scores ticker 57. Other combinations of data and formatting can be provided to suit a customer's needs including, for example, combining weather and sports data to provide weather forecasts for the time and site of a sports contest.

A customer may specify features of the on-air ticker that is created and constantly updated in the editing procedure 20, or may request changes to a ticker that is in use through the ticker setup menu illustrated in the right column 60 of FIG. 2. The setup options available to the customer may include defining or changing the welcome ticker 61, the schedule ticker 62, the scores ticker 63, and the full screen scores ticker 64. Also, the customer may specify or change the logo or advertising message of a broadcast sponsor by way of menu access 65, and may define or change the mix of sports contests reported by way of menu access 66. All of those orders and changes are transmitted back to the web site 30 by way of communications channels 26 and 28, and then to the editing procedure 20 through communications channels 22 and 24.

Turning now to FIGS. 3 and 4, a typical weather ticker main menu 70 is shown in FIG. 3. That menu provides the customer with four options; to return to default settings 72, to select the specific weather data to be broadcast 73, to edit information input by the station 74, and to run and broadcast the weather ticker 75. A typical submenu 80, which is called up by the select weather data option 73, is illustrated in FIG. 4. That submenu allows the customer to specify which weather condition parameters are to be included in the edited stream of data transmitted to web site 30 from the editing procedure 20. As is illustrated in FIG. 4, the submenu is arranged in a group of columns 81 and rows 82 for the convenient entry of the weather data desired and the format in which the data is to be presented. Other weather parameters, for example, the amount of precipitation over a specified time period, whether it is in the form of rain, sleet or snow, the relative humidity, and site-specific weather information, may be selected in a similar fashion.

While the system of this invention has been described in relation to dynamic databases concerned with sports and weather information, it may be used as well for other data categories or combinations thereof. It will be appreciated that the data distribution and broadcast system of this invention provides to the broadcast media an unsurpassed ability to disseminate selected, edited and up to date sports, weather and other information that is customized for the needs and interests of a specific market area.

We claim:

1. A method for merchandising information to a broadcast customer for inclusion in an output video digital data stream, said method comprising:

storing the merchandising information in a database;
receiving changed information;
automatically updating the stored information based on the received changed information;
receiving, from the broadcast customer, a first selection identifying a subset of the stored information as display data;
receiving, from the broadcast customer, a second selection identifying a screen arrangement for the display data, the screen arrangement determining where the display data will be positioned on an output screen which is displaying the output video digital data stream;
defining, at a server, a video layout based on the first and second selections received from the broadcast customer;
formatting, at the server, a broadcast-ready video data stream which includes the display data based on the video layout
transmitting the broadcast-ready video data stream from the server to the broadcast customer;
receiving the broadcast-ready video data stream from the server; and
combining, prior to broadcast, the received broadcast-ready video data stream with video content broadcast by the broadcast customer thereby producing the output video digital data, wherein the combining positions the display data of the received broadcast-ready video data stream and the video content broadcast by the broadcast customer according to the screen arrangement.

2. The method of claim 1, wherein said defining and formatting are performed at a single location that is remote from a location of the broadcast customer.

3. The method of claim 2, wherein said formatting further comprises integrating images associated with the broadcast customer with the broadcast-ready video data stream.

4. The method of claim 1, wherein said merchandising information comprises sports data and weather information.

5. The method of claim 4, wherein said merchandising information includes scores and schedules of contests within a marketing area of the broadcast customer.

6. The method of claim 4, wherein said merchandising information includes weather data from sites within a marketing area of the broadcast customer.

7. The method of claim 4, wherein said defining further comprises associating weather and sports information in the display data with a game-time forecast of weather conditions at a specific game location.

8. The method of claim 1, wherein the output video digital data is a video stream which is correspondingly updated during broadcast when a new first or second selection is received by the server.

9. The method of claim 1, wherein said transmitting further comprises transmitting the broadcast-ready data stream to the broadcast customer upon request of the broadcast customer.

10. The method of claim 1, wherein said formatting further comprises integrating advertising material with the broadcast-ready video data stream.

11. The method of claim 1, wherein each broadcast-ready data stream is different from another broadcast-ready data stream.

12. The method of claim 1, wherein said information includes proprietary information.

13. The method of claim 1, wherein to the broadcast-ready data stream is limited to only the broadcast customer by use of a password.

14. The method of claim 1, wherein the changed information is real-time weather data.

15. The method of claim 1, wherein the first and second selections are performed using an interactive dialog stored on the server.

16. The method of claim 1, wherein the stored information is real-time information.

17. The method of claim 16,
further comprising:
receiving a third selection identifying a second subset of the stored information as second display data;
receiving a fourth selection identifying a second screen arrangement for the second display data, the second screen arrangement determining where the second display data will be positioned on the output screen which is displaying the output video digital data stream,
wherein the defining further comprises defining the video layout based on the first, second, third and fourth selections received from the broadcast customer.

18. The method of claim 1 further comprising:
displaying the output video digital data in which the received broadcast-ready data stream and the video content broadcast by the broadcast customer are simultaneously displayed.

* * * * *